(12) United States Patent
Wellhausen

(10) Patent No.: US 10,527,000 B2
(45) Date of Patent: Jan. 7, 2020

(54) AIRCRAFT WITH A HOT AIR EXHAUST THAT COMPRISES TWO PIVOTALLY MOUNTED EXHAUST SECTIONS

(71) Applicant: AIRBUS HELICOPTERS DEUTSCHLAND GMBH, Donauworth (DE)

(72) Inventor: Christian Wellhausen, BZ Wassenaar (NL)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 440 days.

(21) Appl. No.: 15/364,550

(22) Filed: Nov. 30, 2016

(65) Prior Publication Data

US 2017/0175673 A1    Jun. 22, 2017

(30) Foreign Application Priority Data

Dec. 16, 2015    (EP) ..................................... 15400054

(51) Int. Cl.
*F02K 1/04* (2006.01)
*F02K 1/00* (2006.01)
(Continued)

(52) U.S. Cl.
CPC .............. *F02K 1/002* (2013.01); *B64D 33/04* (2013.01); *F02K 1/004* (2013.01); *F02K 1/006* (2013.01);
(Continued)

(58) Field of Classification Search
CPC .......... F02K 1/002; F02K 1/004; F02K 1/006; F02K 1/008; F02K 1/04; F02K 1/15; F02K 9/80; F02K 9/805; F02K 9/84
See application file for complete search history.

(56) References Cited

U.S. PATENT DOCUMENTS 2,871,656 A    2/1959    Johnson
2,886,262 A *  5/1959    Fletcher ................ B64C 23/005
                                                                239/265.35
(Continued)

FOREIGN PATENT DOCUMENTS

EP    1817490       8/2007
EP    1887208 A2    2/2008
(Continued)

OTHER PUBLICATIONS

French Search Report for French Application No. FR 1502453, Completed by the French Patent Office, dated Sep. 1, 2016, 8 Pages.
(Continued)

*Primary Examiner* — Steven M Sutherland
(74) *Attorney, Agent, or Firm* — Brooks Kushman P.C.

(57) ABSTRACT

An aircraft with at least one engine that generates a hot air flow in operation of the aircraft, wherein at least one hot air exhaust is provided for exhausting the generated hot air flow, the at least one hot air exhaust comprising at least one first exhaust section that is mounted in a rotatable manner to at least one second exhaust section via an associated off-axis swivel joint, wherein an actuating member is provided that is adapted for applying a turning moment to the at least one second exhaust section in operation of the aircraft in order to displace a longitudinal axis of the at least one second exhaust section with respect to a longitudinal axis of the at least one first exhaust section by a predetermined displacement angle.

19 Claims, 6 Drawing Sheets

(51) Int. Cl.
*B64D 33/04* (2006.01)
*F02K 9/84* (2006.01)
*F02K 9/80* (2006.01)

(52) U.S. Cl.
CPC ............... *F02K 1/008* (2013.01); *F02K 9/80* (2013.01); *F02K 9/84* (2013.01); *Y02T 50/672* (2013.01)

(56) References Cited

U.S. PATENT DOCUMENTS

| | | | |
|---|---|---|---|
| 2,933,891 A | 4/1960 | Britt | |
| 3,067,579 A | 12/1962 | Olbrich | |
| 3,180,087 A | 4/1965 | Marchant | |
| 3,355,889 A | 12/1967 | Taylor et al. | |
| 3,400,540 A | 9/1968 | Cresswell et al. | |
| 3,441,220 A | 4/1969 | Wildner | |
| 3,451,624 A | 6/1969 | Haberkorn et al. | |
| 3,525,475 A | 8/1970 | Schweikl | |
| 3,837,578 A | 9/1974 | Leibach | |
| 3,989,192 A * | 11/1976 | Enderle | F02K 1/004 239/265.35 |
| 4,132,089 A | 1/1979 | Skinner et al. | |
| 4,248,041 A | 2/1981 | Wilde et al. | |
| 4,679,732 A | 7/1987 | Woodward | |
| 6,390,412 B1 | 5/2002 | Stevens | |
| 6,735,500 B2 | 5/2004 | Nicholas et al. | |
| 7,631,481 B2 | 12/2009 | Cowan et al. | |
| 2004/0010354 A1 | 1/2004 | Nicholas et al. | |
| 2007/0151229 A1* | 7/2007 | Farah | F02K 1/002 60/232 |
| 2007/0164167 A1 | 7/2007 | Bachelder et al. | |
| 2011/0030380 A1 | 2/2011 | Widdle, Jr. et al. | |
| 2013/0221153 A1 | 8/2013 | Worsham, II et al. | |
| 2014/0060004 A1* | 3/2014 | Mast | B64C 27/28 60/204 |

FOREIGN PATENT DOCUMENTS

| | | |
|---|---|---|
| EP | 1887208 A3 | 11/2010 |
| EP | 2572984 | 3/2013 |
| FR | 2766158 | 1/1999 |
| GB | 755019 | 8/1956 |

OTHER PUBLICATIONS

Exented European Search Report Search Report for European Application No. EP 15400054.1, Completed by the European Patent Office, dated Jun. 22, 2016, 7 Pages.

* cited by examiner

AIRCRAFT WITH A HOT AIR EXHAUST THAT COMPRISES TWO PIVOTALLY MOUNTED EXHAUST SECTIONS

CROSS REFERENCE TO RELATED APPLICATION

This application claims priority to European patent application No. EP 15400054.1 filed on Dec. 16, 2015, the disclosure of which is incorporated in its entirety by reference herein.

BACKGROUND OF THE INVENTION (1) Field of the Invention

The invention is related to an aircraft with a fuselage that defines at least one drive system accommodating region, the drive system accommodating region accommodating at least one engine that generates a hot air flow in operation of the aircraft, wherein at least one hot air exhaust is provided for exhausting the generated hot air flow, said aircraft comprising the features of claim 1. The invention is further related to a method of operating a hot air exhaust of an aircraft with a fuselage, the hot air exhaust being adapted for exhausting a hot air flow that is generated by at least one engine of the aircraft in operation, said method comprising the steps of claim 12.

(2) Description of Related Art

A fuselage of an aircraft, and in particular of a rotary-wing aircraft, generally defines an interior region and a drive system accommodating region that is arranged inside the fuselage. The interior region usually comprises at least a cockpit and may further comprise a cabin for passengers and/or cargo. The drive system accommodating region usually accommodates one or more engines that are adapted for driving the aircraft, e.g. by providing power to an associated power distribution unit, such as a gearbox, which then provides this power to a suitable propelling unit, such as e.g. a propeller, rotor or other.

Typically, the one or more engines are embodied as air breathing propulsion engines, such as diesel engines, gas engines, gas turbines and so on, which combust a fuel/air mix for power generation. In operation, all such air breathing propulsion engines need fresh air, ideally cold air, which is mixed with fuel so that these engines perform sufficiently and satisfactorily.

However, all such air breathing propulsion engines will not only generate power in operation, but also heat that must be dissipated from the engines for preventing an overheating thereof, which is crucial for the entire aircraft performance, safety and reliability. Generally, such heat is transformed into hot air flows that are dissipated from the engines and exhausted from the rotary-wing aircrafts via suitable hot air exhausts provided at the fuselages.

Usually, the hot air exhausts of rotary-wing aircrafts are implemented by means of straight or mostly straight exhaust ducts. These exhaust ducts guide generated hot air flows from the engines through associated engine cowlings. The main reason for making these exhaust ducts as straight as possible is an aerodynamic friction loss that would occur if the generated hot air flows would not be exhausted at least approximately coaxial to a longitudinal axis of the rotary-wing aircraft, but with a predefined deflection angle relative thereto.

The straight or mostly straight shaping of the exhaust ducts and their conventional arrangement at the fuselages leads to beams of generated hot air flows which are usually guided quite close to the rotary-wing aircraft, leading to local heating-up of the aircraft's airframe structure, especially in an intermediate structure and/or corresponding tail boom areas close to respective exhaust duct outlets. However, such a local heating-up may damage or even destroy the intermediate structure and/or corresponding tail boom areas, if they are excessively heated up above an underlying operational limit of structural materials used. Therefore, counter measures must be taken in order to avoid such an excessive heating-up, in particular of load-carrying structural parts of the rotary-wing aircraft.

One conventional counter measure for protecting load-carrying structural parts of rotary-wing aircrafts against excessive heating-up consists in providing heat-insulation/shielding panels mounted on top of the load-carrying structural parts. Such panels are usually spaced apart from the corresponding load-carrying structural parts so that a gap is provided that allows air ventilation between the panels and the corresponding load-carrying structural parts. Furthermore, the panels can be painted with heat-resistant, mate black or anthracite top coats. However, such heat-insulation/shielding panels are usually adding extra weight onto the aircraft's airframe structure. Also, they create additional aerodynamic drag and disturb respective exterior aspects/designs of rotary-wing aircrafts.

Another option for protecting load-carrying structural parts of rotary-wing aircrafts against excessive heating-up by means of beams of exhausted generated hot air flows consists in providing longer and/or bended exhaust ducts. However, longer and/or bended exhaust ducts create aerodynamic friction within the exhaust ducts and are, therefore, reducing available engine power and decreasing fuel efficiency.

Still alternatively, the load-carrying structural parts can be implemented with structural materials that are able to cope with higher service temperatures in order to avoid provision of heat-insulation/shielding panels and/or longer and/or bended exhaust ducts. However, materials that are able to cope with such higher service temperatures are usually expensive and labor-intensive during manufacturing. Therefore, this alternative is generally avoided due to massive cost drawbacks.

Still alternatively, exhaust ducts can be cooled by suitable cooling means. By way of example, the documents EP 1 887 208 A2 and EP 1 817 490 A1 describe cooled exhaust ducts. However, such cooled exhaust ducts are generally expensive and complicated to manufacture.

The documents U.S. Pat. Nos. 4,679,732 A, 4,248,041 A, 4,132,089 A, 3,837,578 A, 3,525,475 A, 3,451,624 A, 3,400,540 A, 3,441,220 A, 3,355,889 A, 3,180,087 A, 3,067,579 A and 2,933,891 A describe vectorable, i.e. at least partly rotatable exhaust ducts, where at least one first exhaust section is mounted in a rotatable manner to at least one second exhaust section. However, these vectorable exhaust ducts define jet pipes that are used for expelling thrust gases of aircraft jet engines for generating propulsive jets.

BRIEF SUMMARY OF THE INVENTION

It is, therefore, an object of the present invention to provide a new aircraft with at least one engine that generates a hot air flow in operation of the aircraft and with at least one hot air exhaust that is provided for exhausting the generated hot air flow such that at least an excessive heating-up of load-carrying structural parts of the aircraft by means of the exhausted hot air flow can be reduced so that damaging or destruction of the load-carrying structural parts can reliably be prevented.

This object is solved by an aircraft with at least one engine that generates a hot air flow in operation of the aircraft and with at least one hot air exhaust that is provided for exhausting the generated hot air flow, said aircraft comprising the features of claim 1.

More specifically, according to the present invention an aircraft with a fuselage that defines at least one drive system accommodating region is provided. The drive system accommodating region accommodates at least one engine that generates a hot air flow in operation of the aircraft, wherein at least one hot air exhaust is provided for exhausting the generated hot air flow. The at least one hot air exhaust comprises at least one first exhaust section and at least one second exhaust section, the at least one second exhaust section being mounted in a rotatable manner to the at least one first exhaust section via an associated off-axis swivel joint. An actuating member is provided that is adapted for applying a turning moment to the at least one second exhaust section in operation of the aircraft in order to displace a longitudinal axis of the at least one second exhaust section with respect to a longitudinal axis of the at least one first exhaust section by a predetermined displacement angle on the basis of at least one of: current aviation parameters of the aircraft in operation, a current temperature in a region of the fuselage to which the generated hot air flow is exhausted via the at least one hot air exhaust and/or a current operation temperature of the actuating member.

According to one aspect of the present invention, a selective deflection of the generated hot air flow can be achieved by rotating the at least one second exhaust section relative to the at least one first exhaust section around the associated off-axis swivel joint in operation of the aircraft, if an undesired and excessive heating-up of aircraft components, and in particular of load-carrying structural parts of the aircraft, is expected to occur. Such a selective deflection of the generated hot air flow is suitable for avoiding an excessive heating-up, as it is essentially only required for only a few specific flight conditions, such as e.g. hover flight with unfavorable crosswinds in the case of a rotary-wing aircraft.

More specifically, during flight conditions that may usually lead to excessive heating-up of the aircraft's airframe structure, in particular of load-carrying structural parts thereof, higher friction losses could generally at least partially be accepted for a limited time frame without compromising an overall performance and efficiency of the aircraft. This is acceptable as such higher friction losses, and therefore reduced power and increased fuel consumption, only occur in flight maneuvers that need high engine power output, while an excessive heating-up of respective load-carrying structural parts usually only occurs during flight conditions with low or no airspeed, such as e.g. hovering in the case of a rotary-wing aircraft. Therefore, the temporary deflection of the generated hot air flow away from the airframe structure during these flight conditions with low or no airspeed securely and reliably prevents an excessive heating-up of load-carrying structural parts of an aircraft in operation.

Advantageously, by selectively deflecting the generated hot air flow in operation of an aircraft, implementation of the above-described counter measures, i.e. the provision of heat-insulation/shielding panels, longer and/or bended exhaust ducts, structural materials that are able to cope with higher service temperatures and/or cooled exhaust ducts, can be avoided. Thus, a weight reduction and optical/design benefits can be achieved. Furthermore, an extension of lifetime of a top coat painting provided on the aircraft's airframe structure can be achieved, as an excessive heating-up thereof is at least reduced. Moreover, engines with higher power output can be installed in the aircrafts without need to redesign/recalculate existing aircraft airframe structures.

According to one aspect of the present invention, the at least one first exhaust section of the at least one hot air exhaust is implemented as a front exhaust pipe with a first diameter that is fixedly mounted on the fuselage of the aircraft, and the at least one second exhaust section is implemented as a rear exhaust pipe with a second diameter that is swivel mounted on the front exhaust pipe. The radius of the rear exhaust pipe is preferably greater than the radius of the front exhaust pipe. On the outer surface of the rear exhaust pipe, the actuating member is preferably mounted in a rotatable manner, e.g. by means of a ball joint. The other end of this actuating member is preferentially mounted in a rotatable manner on the fuselage of the aircraft, e.g. on a corresponding tail boom in the case of a rotary-wing aircraft.

Preferably, in normal flight conditions of the aircraft where no excessive heating-up is to be expected, in particular close to a corresponding outlet of the at least one hot air exhaust, both center axes of the front and rear exhaust pipes are aligned and the generated hot air flow is not deflected. However, if an excessive heating-up could be expected and/or if the flight conditions require a reduction of the temperature present on the fuselage of the aircraft close to the corresponding outlet of the at least one hot air exhaust, e.g. during hovering in the case of a rotary-wing aircraft, the actuating member is activated for turning, i.e. rotating the rear exhaust pipe with an angle $\alpha$ relative to the front exhaust pipe away from the fuselage.

Advantageously, due to the angled swivel mounting of the rear exhaust pipe on the front exhaust pipe with a swivel angle $\gamma$ comprised in a range of $5° \leq \gamma \leq 30°$ of the swivel plane, a changing of the angle $\alpha$ by means of the actuating member causes a change of a corresponding deflection angle $\beta$ of the exhausted hot air flow, which means a deflection of the second exhaust pipe and therefore of the exhausted hot air flow. Preferably, a maximum angle $\beta$ that can be reached depends on the swivel angle $\gamma$, which is preferentially constant and defined during an underlying design phase of the aircraft. Also, an underlying design of a linkage of the actuating member is influencing the maximum deflection angle $\beta$ and, from a practical view, it is supposed that a deflection angle $\beta$ in a range of $10° \leq \beta \leq 30°$ is suitable for preventing the excessive heating-up of the aircraft's airframe structure above a maximum operation limit, which is set by corresponding materials used in the area of the fuselage that is close to the corresponding outlet of the at least one hot air exhaust. Usually, the maximum operating temperature of the metallic or composite materials used for load-carrying structures in this area is between 100 and 250° C.

Preferably, the actuating member is directly and/or indirectly activatable. More specifically, an indirect actuation can be achieved on the basis of pre-programmed parameter sets that take into account a current flight attitude and/or engine operating conditions. Direct actuation can be implemented on the basis of a respectively measured surface temperature on the fuselage of the aircraft and/or by using a temperature-sensitive actuator. The latter can advantageously be placed in the area of the structure which is loaded with the maximum service temperature, wherein the actuator itself is temperature-sensitive, e.g. by means of an expanding fluid, gas or rigid medium, and directly generating all necessary forces for turning the rear exhaust pipe.

According to one aspect of the present invention, the aircraft is a rotary-wing aircraft and, preferably, a helicopter. The airframe structure of this aircraft preferably corresponds to its fuselage, so that the terms "airframe structure" and "fuselage" are interchangeably used hereinafter.

According to a preferred embodiment, the actuating member comprises a temperature-sensitive actuator, wherein the temperature-sensitive actuator is equipped with an expandable fluid or gas that is adapted for expanding if the current operation temperature of the actuating member increases.

According to a further preferred embodiment, the temperature-sensitive actuator is at least mounted adjacent to a temperature-critical area of the fuselage.

According to a further preferred embodiment, the actuating member is mounted to the at least one second exhaust section by means of a first bearing and to the fuselage by means of a second bearing.

According to a further preferred embodiment, the actuating member comprises a temperature-sensitive actuator, wherein the temperature-sensitive actuator is equipped with an expandable rigid material that is adapted for expanding if the current operation temperature of the actuating member increases.

According to a further preferred embodiment, the temperature-sensitive actuator is at least mounted adjacent to a temperature-critical area of the fuselage.

According to a further preferred embodiment, the actuating member and/or sensors that are provided for controlling actuation of the actuating member are at least adapted for operation at temperatures between 100° C. and 250° C.

According to a further preferred embodiment, the sensors comprise at least one temperature sensor.

According to a further preferred embodiment, the associated off-axis swivel joint defines a swivel angle to a transversal direction of the at least one first exhaust section that is comprised in a range between 5° and 30°.

According to a further preferred embodiment, the predetermined displacement angle is comprised in a range between 10° and 30°.

According to a further preferred embodiment, the at least one second exhaust section comprises an exhaust diameter that is greater than an exhaust diameter of the at least one first exhaust section.

The present invention further provides a method of operating a hot air exhaust of an aircraft with a fuselage, wherein the hot air exhaust is adapted for exhausting a hot air flow that is generated by at least one engine of the aircraft in operation, and wherein the hot air exhaust comprises at least one first exhaust section and at least one second exhaust section, the at least one second exhaust section being mounted in a rotatable manner to the at least one first exhaust section via an associated off-axis swivel joint and being rotatable by means of an actuating member. The method comprises at least the steps of: —Determining current aviation parameters of the aircraft in operation, a current temperature in a region of the fuselage to which the generated hot air flow is exhausted via the hot air exhaust and/or a current operation temperature of the actuating member, and —Applying a turning moment to the at least one second exhaust section by means of the actuating member on the basis of the current aviation parameters of the aircraft in operation, the current temperature in a region of the fuselage to which the generated hot air flow is exhausted via the hot air exhaust and/or the current operation temperature of the actuating member in order to displace a longitudinal axis of the at least one second exhaust section with respect to a longitudinal axis of the at least one first exhaust section by a predetermined displacement angle.

According to one aspect of the present invention, the current aviation parameters comprise at least a current engine power output, current flight conditions such as e.g. airspeed and tail rotor pitch, and/or engine/flight condition "history", e.g. monitoring of the last 10 min of flight. These current aviation parameters can e.g. be analyzed using a suitable algorithm that preferably also allows for a parameter integration of thermal inertia of the fuselage, as heating-up thereof by means of the exhausted hot air flow occurs only with a delay.

According to one aspect of the present invention, the current temperature in a region of the fuselage to which the generated hot air flow is exhausted via the hot air exhaust can be cross-checked with other flight/engine conditions. This would allow flying, at least for a restricted time frame, also with the front and rear exhaust pipes that are aligned such that the generated hot air flow is not deflected, even though a current temperature on the fuselage in a region close to an outlet of the hot air exhaust is temporarily too high.

According to a preferred embodiment, the step of applying the turning moment to the at least one second exhaust section comprises applying the turning moment to the at least one second exhaust section if the current operation temperature of the actuating member exceeds a predetermined threshold value.

According to a further preferred embodiment, the actuating member comprises a temperature-sensitive actuator, which is equipped with an expandable fluid or gas that is adapted for expanding if the current operation temperature of the actuating member increases, wherein the predetermined threshold value defines a temperature at which the expandable medium starts to expand in operation.

According to a further preferred embodiment, the actuating member comprises a temperature-sensitive actuator, which is equipped with an expandable rigid material that is adapted for expanding if the current operation temperature of the actuating member increases, wherein the predetermined threshold value defines a temperature at which the expandable medium starts to expand in operation.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
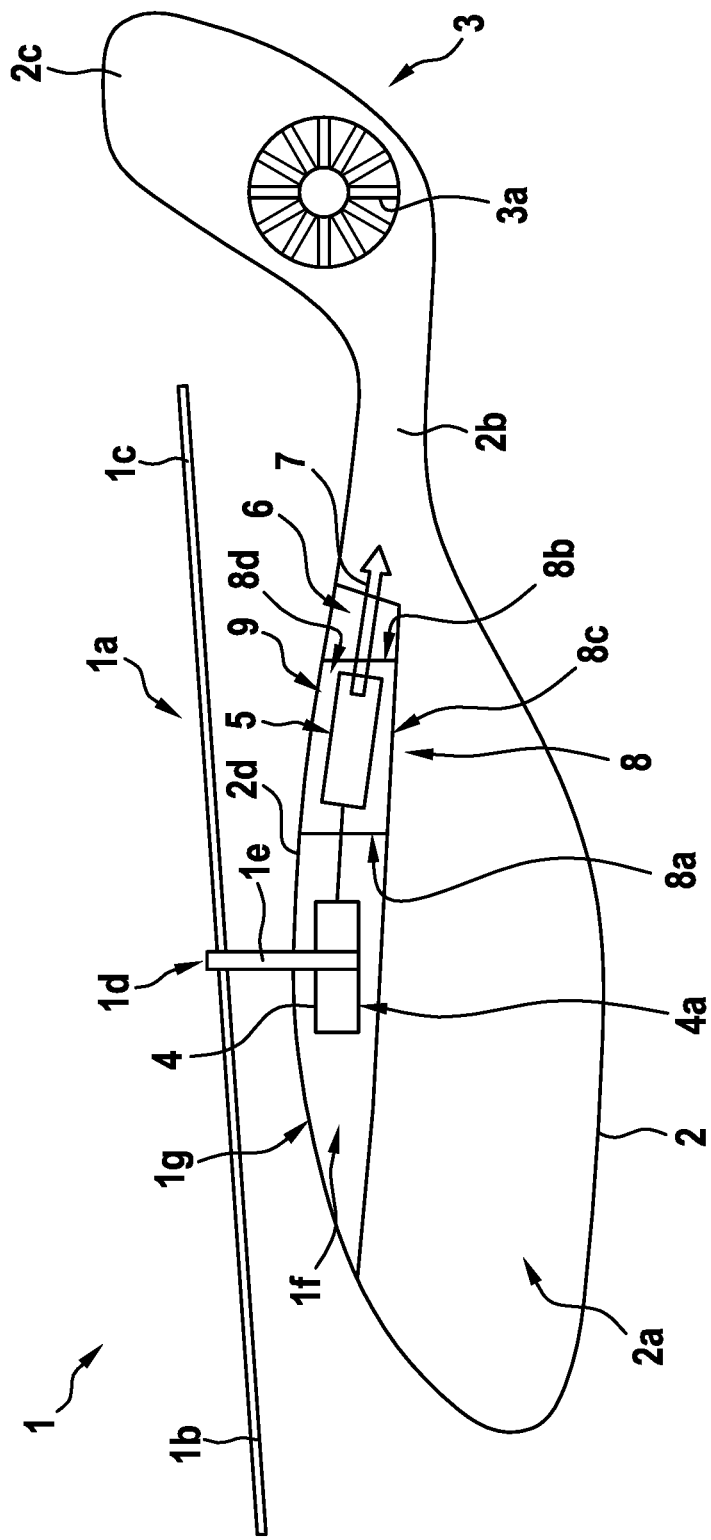
FIG. 1 shows a schematic side view of an aircraft with at least one engine and at least one hot air exhaust according to the present invention.

FIG. 1 shows an aircraft 1, which comprises a fuselage 2 that defines at least an interior region 2a and a drive system accommodating region 1f according to one aspect of the present invention. The aircraft 1 is exemplarily embodied as a rotary-wing aircraft and, in particular, as a helicopter. Therefore, the aircraft 1 is also referred to hereinafter as the "helicopter 1" for simplicity and clarity. It should, however, be noted that the present invention is not limited to helicopters and can likewise be applied to other aircrafts.

Illustratively, the fuselage 2 further defines an outer surface 1g of the aircraft 1 and at least one tail boom 2b, but may moreover define a cockpit, as well as a passenger cabin and/or a cargo compartment. However, for simplicity and clarity of the drawings, such a cockpit, passenger cabin and cargo compartment are not shown and explained in greater detail.

The helicopter 1 illustratively comprises at least one main rotor 1a for providing lift and forward or backward thrust during operation. The at least one main rotor 1a is preferably drivingly coupled to at least one engine 5 and preferentially embodied as a multi-blade rotor. The latter exemplarily comprises a plurality of rotor blades 1b, 1c that are mounted at an associated rotor head 1d to a rotor shaft 1e, which rotates in operation of the helicopter 1 around an associated rotor axis. Preferably, the rotor shaft 1e is drivingly connected to a main gearbox 4 of the helicopter 1, which is also preferably drivingly connected to the at least one engine 5, both of which are preferentially arranged in the drive system accommodating region 1f.

According to one aspect of the present invention, the at least one engine 5 implements a main engine of the helicopter 1 and is therefore also referred to as the "main engine 5" hereinafter, for simplicity and clarity. Preferably, this main engine 5 is embodied as an air breathing propulsion engine, such as e.g. a diesel engine, gas engine, gas turbine and so on. It should, however, be noted that the present invention is not limited to such an implementation of the helicopter's main engine, which is merely described for purposes of illustration and explanation, and that the at least one engine 5 may also implement e.g. a supplementary engine instead of a main engine.

Preferably, at least one hot air exhaust 6 is provided for expelling a hot air flow 7 generated by the main engine 5 in operation. This at least one hot air exhaust 6 is illustratively at least partly located in the vicinity of the tail boom 2b.

Furthermore, the helicopter 1 may comprise one or more counter-torque devices configured to provide counter-torque during operation, i.e. to counter the torque created by rotation of the at least one main rotor 1a for purposes of balancing the helicopter 1 in terms of yaw. By way of example, a counter-torque device 3 with a tail rotor 3a is provided in the region of a fin 2c embodied at the tail boom 2a, which may further be provided e.g. with a horizontal stabilizer, a bumper and/or a tail wing embodied by or attached to the fuselage 2.

As already described above, the fuselage 2 defines the drive system accommodating region 1f, which is preferably arranged inside the fuselage 2. More specifically, the drive system accommodating region if defines an upper deck region of the fuselage 2, which is arranged inside the fuselage 2 adjacent to an upper fuselage side 2d thereof. Illustratively, the upper fuselage side 2d is a side of the fuselage 2 that faces the plurality of rotor blades 1b, 1c. Accordingly, for simplicity and clarity, the drive system accommodating region if is also referred to as the "upper deck region 1f" hereinafter.

According to one aspect of the present invention, the upper deck region if comprises at least one fire protection zone 9 that is defined by at least one firewall arrangement 8. This at least one fire protection zone 9 preferably accommodates the main engine 5 within the at least one firewall arrangement 8 such that the at least one firewall arrangement 8 defines a fire-resistant separation between the main engine 5 and the interior region 2a of the fuselage 2. Therefore, the at least one firewall arrangement 8 comprises a plurality of preferably interconnected fire protection walls 8a, 8b, 8c and 8d that delimit the at least one fire protection zone 9. By way of example, and seen in a forward flight direction of the helicopter 1, the fire protection wall 8a defines a front fire protection wall, the fire protection wall 8b defines a rear fire protection wall, the fire protection wall 8c defines a lower fire protection wall and the fire protection wall 8d defines a middle fire protection wall.

Figure 2:
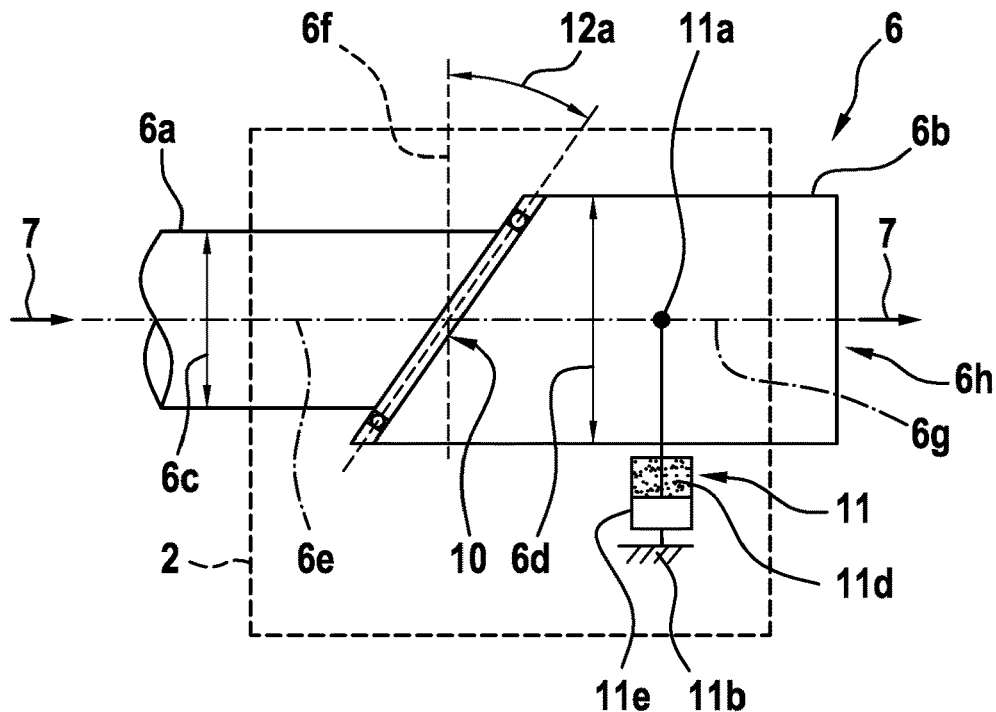
FIG. 2 shows a side view of the at least one hot air exhaust of FIG. 1 with an actuating member in normal operation mode.

FIG. 2 shows a section of the fuselage 2 of the helicopter 1 of FIG. 1 with the at least one hot air exhaust 6 of FIG. 1 that is provided for exhausting the generated hot air flow 7 from the main engine 5 of FIG. 1. For simplicity and clarity of the drawings, only a single hot air exhaust 6 is illustrated and described hereinafter. This single hot air exhaust 6 is, therefore, referred to as "the hot air exhaust 6". However, it should be noted that the helicopter 1 of FIG. 1 may also comprise two or more hot air exhausts, e.g. one hot air exhaust for each provided main engine or two or more hot air exhausts for the main engine 5 of FIG. 1. In such configurations, preferably at least one hot air exhaust is embodied like the hot air exhaust 6 according to the present invention.

According to one aspect of the present invention, the hot air exhaust 6 comprises at least one first exhaust section 6a and at least one second exhaust section 6b, which preferentially defines a hot air outlet 6h. In operation, the generated hot air flow 7 is guided from the main engine 5 of FIG. 1 through the at least one first exhaust section 6a to the at least one second exhaust section 6b and then expelled via the hot air outlet 6h. Therefore, the latter can be provided with a suitable nozzle.

The at least one first exhaust section 6a, which is hereinafter also referred to as "the front exhaust section 6a", is preferably embodied as an essentially straight exhaust pipe. This front exhaust section 6a is preferentially connected with one axial end to the main engine 5 of FIG. 1 and with its other axial end, which is preferably obliquely cut off, mounted to an associated off-axis swivel joint 10. The at least one second exhaust section 6b, which is hereinafter also referred to as "the rear exhaust section 6b", is preferably also embodied as an essentially straight exhaust pipe. This rear exhaust section 6b comprises one axial end, which is preferably obliquely cut off and mounted to the associated off-axis swivel joint 10, while its other axial end, which is a free end, defines a hot air outlet 6h of the hot air exhaust 6. Preferably, the rear exhaust section 6b is mounted in a rotatable manner to the front exhaust section 6a via the associated off-axis swivel joint 10.

It should be noted that construction and functionality of an off-axis swivel joint are well-known to the person skilled in the art. Therefore, the associated off-axis swivel joint 10 and the mounting of the front and rear exhaust sections 6a, 6b to each other by means of the off-axis swivel joint 10 are not described in greater detail hereinafter, for brevity and conciseness.

Illustratively, the front exhaust section 6a comprises a longitudinal axis 6e and an exhaust diameter 6c. The exhaust diameter 6c defines a transversal direction 6f, i.e. a sectional plane of the front exhaust section 6a. Preferably, the associated off-axis swivel joint 10 defines a swivel angle 12a to the transversal direction 6f that is comprised in a range between 5° and 30°.

Similarly, the rear exhaust section 6b comprises a longitudinal axis 6g and an exhaust diameter 6d, which defines a sectional plane of the rear exhaust section 6b. The exhaust diameter 6d of the rear exhaust section 6b is preferably greater than the exhaust diameter 6c of the front exhaust section 6a. Furthermore, the sectional plane defined by the exhaust diameter 6d of the rear exhaust section 6b is preferentially at least essentially parallel to the sectional plane defined by the exhaust diameter 6c of the front exhaust section 6a in normal operation mode, wherein the longitudinal axes 6e, 6g are at least coaxially arranged and, preferably, aligned with each other.

According to one aspect of the present invention, an actuating member 11 is provided that is adapted for applying a turning moment to the rear exhaust section 6b in operation of the helicopter 1 of FIG. 1 in order to displace the longitudinal axis 6g of the rear exhaust section 6b with respect to the longitudinal axis 6e of the front exhaust section 6a in heat-protection mode. More specifically, the turning moment is applied for displacing inclining the sectional plane defined by the exhaust diameter 6d of the rear exhaust section 6b relative to the sectional plane defined by the exhaust diameter 6c of the front exhaust section 6a.

Preferably, the actuating member 11 is at least adapted for operation at temperatures between 100° C. and 250° C. Illustratively, the actuating member 11 is mounted to the rear exhaust section 6b by means of a first bearing 11a and to the fuselage 2 of the helicopter 1 of FIG. 1 by means of a second bearing 11b. The first and second bearings 11a, 11b can e.g. be implemented by ball bearings or joints. Preferentially, the actuating member 11 comprises at least one actuator 11e that is adapted for generating a force that is translated into the turning moment by means of the first and second bearings 11a, 11b.

According to one aspect of the present invention, the actuator 11e and, thus, the actuating member 11 creates and applies the turning moment on the basis of at least one of: current aviation parameters of the helicopter 1 of FIG. 1 in operation, a current temperature in a region of the fuselage 2 to which the generated hot air flow 7 is exhausted via the hot air exhaust 6 and/or a current operation temperature of the actuating member 11. Exemplary operating methods are described below with reference to FIG. 7 to FIG. 9.

Preferably, the actuator 11e is temperature-sensitive and is preferentially equipped with a temperature-sensitive activatable medium 11d. For instance, the temperature-sensitive activatable medium 11d can be realized with an expandable fluid and/or gas and/or rigid material that is adapted for expanding if a current operation temperature of the temperature-sensitive actuator 11e, i.e. the actuating member 11, increases. Preferably, the temperature-sensitive actuator 11e is at least mounted adjacent to a temperature-critical area of the fuselage 2, i.e. close to the rear exhaust section 6b and/or the hot air outlet 6h.

Figure 3:
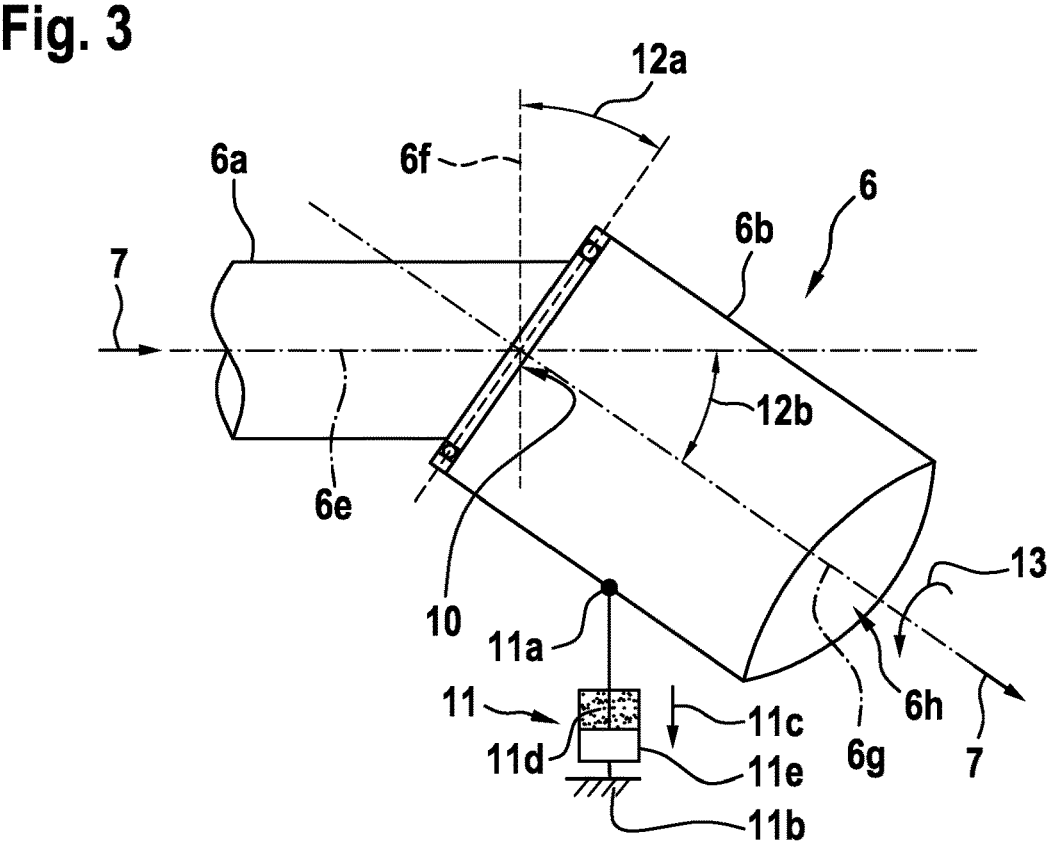
FIG. 3 shows a side view of the at least one hot air exhaust of FIG. 2 in heat-protection mode.

FIG. 3 shows the hot air exhaust 6 of FIG. 2 with the front exhaust section 6a having the longitudinal axis 6e and the rear exhaust section 6b having the longitudinal axis 6g and the hot air outlet 6h. By way of example, the hot air exhaust 6 is illustrated in heat-protection mode.

According to one aspect of the present invention, the temperature-sensitive activatable medium 11d of the temperature-sensitive actuator 11e of the actuating member 11 of FIG. 2 applies the turning moment to the rear exhaust section 6b if the current operation temperature of the temperature-sensitive actuator 11e, i.e. the actuating member 11, exceeds a predetermined threshold value. This predetermined threshold value depends besides others on a maximum reachable temperature of the hot air flow 7 of FIG. 2 and a maximum sustainable temperature that components of the fuselage 2 of FIG. 2 that need to be protected may withstand in operation.

In operation, the temperature-sensitive activatable medium 11d exemplarily expands if the current operation temperature exceeds the predetermined threshold value, thereby pulling the rear exhaust section 6b into an exemplary movement direction 11c. This leads to a rotation of the rear exhaust section 6b around the associated off-axis swivel joint 10 of FIG. 2 into an exemplary rotation direction 13, such that illustratively the longitudinal axis 6g of the rear exhaust section 6b is displaced with respect to the longitudinal axis 6e of the front exhaust section 6a by a predetermined displacement angle 12b. The predetermined displacement angle 12b is preferentially comprised in a range between 10° and 30°. Thus, the exhausted generated hot air flow 7 can be deflected and directed away from the fuselage 2 of FIG. 2.

Figure 4:
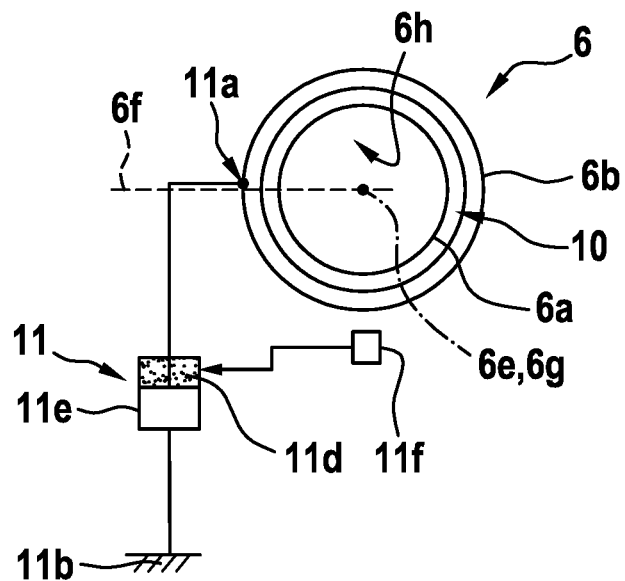
FIG. 4 shows a plan view of the at least one hot air exhaust of FIG. 2.

FIG. 4 shows the hot air exhaust 6 with the actuating member 11 of FIG. 2 in normal operation mode, with the front exhaust section 6a having the longitudinal axis 6e and the rear exhaust section 6b having the longitudinal axis 6g and the hot air outlet 6h. FIG. 4 further illustrates the coaxial arrangement, i.e. the exemplary aligned arrangement, of the longitudinal axes 6e, 6g.

According to one aspect of the present invention, the actuating member 11 is connected to one or more sensors 11f. The sensors 11f are preferably provided for controlling actuation of the actuating member 11 and are at least adapted for operation at temperatures between 100° C. and 250° C. Preferentially, the sensors 11f comprise at least one temperature sensor.

It should be noted that provision of the temperature-sensitive activatable medium 11d and, consequently, of the temperature-sensitive actuator 11e of FIG. 2 can be omitted if the one or more sensors 11f are provided for controlling actuation of the actuating member 11. In this case, e.g. an electrical, magnetic and/or hydraulic actuator can be used with the actuating member 11.

Figure 5:
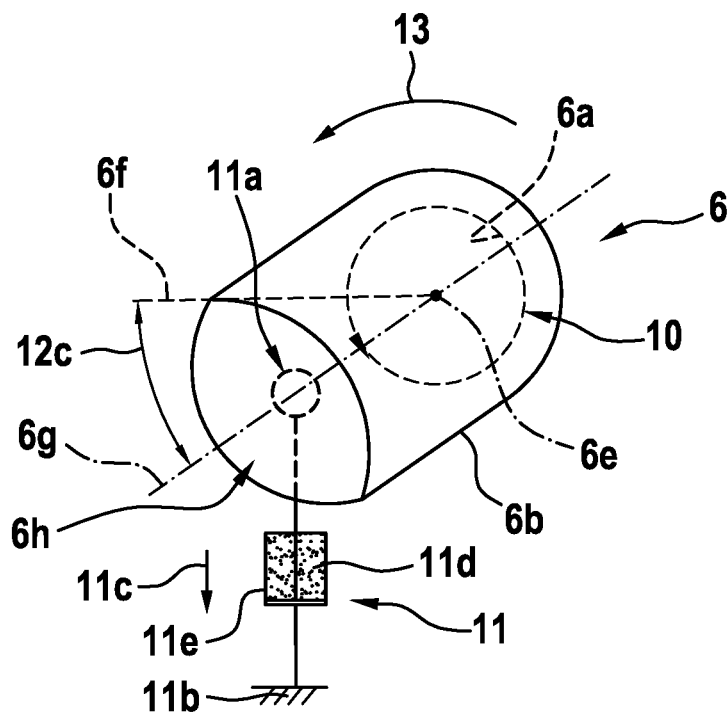
FIG. 5 shows a plan view of the at least one hot air exhaust of FIG. 3.

FIG. 5 shows the hot air exhaust 6 with the actuating member 11 of FIG. 3 in heat-protection mode, with the front exhaust section 6a having the longitudinal axis 6e and the rear exhaust section 6b having the longitudinal axis 6g and the hot air outlet 6h. FIG. 5 further illustrates the displacement of the longitudinal axes 6e, 6g by the predetermined displacement angle 12b of FIG. 3, i.e. a corresponding inclination angle 12c.

Figure 6:
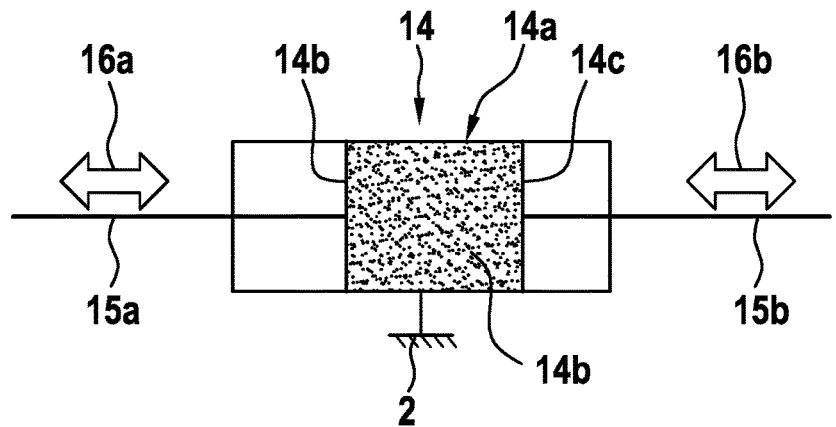
FIG. 6 shows a schematic view of a double-sided actuating member according to one embodiment.

FIG. 6 shows a double-sided actuating member 14 according to one aspect of the present invention. More specifically, in various application scenarios, two hot air exhausts according to the present invention would need to be actuated simultaneously, e.g. if the helicopter 1 of FIG. 1 is equipped with two separate main engines 5, each being provided with the hot air exhaust 6 of FIG. 2 to FIG. 5.

Preferably, the double-sided actuating member 14 comprises at least one actuator 14a, which is preferentially equipped with an expandable medium 14b. According to one aspect of the present invention, the at least one actuator 14a is hydraulic or electrically driven.

If the at least one actuator 14a is hydraulic, a single master cylinder featuring one hydraulic fluid chamber containing the expandable medium 14b can be provided, as illustrated. The expandable medium 14b is preferably adapted for controlling movement of two control rods 15a, 15b in opposite directions, e.g. in linear movement directions 16a, 16b.

Figure 7:
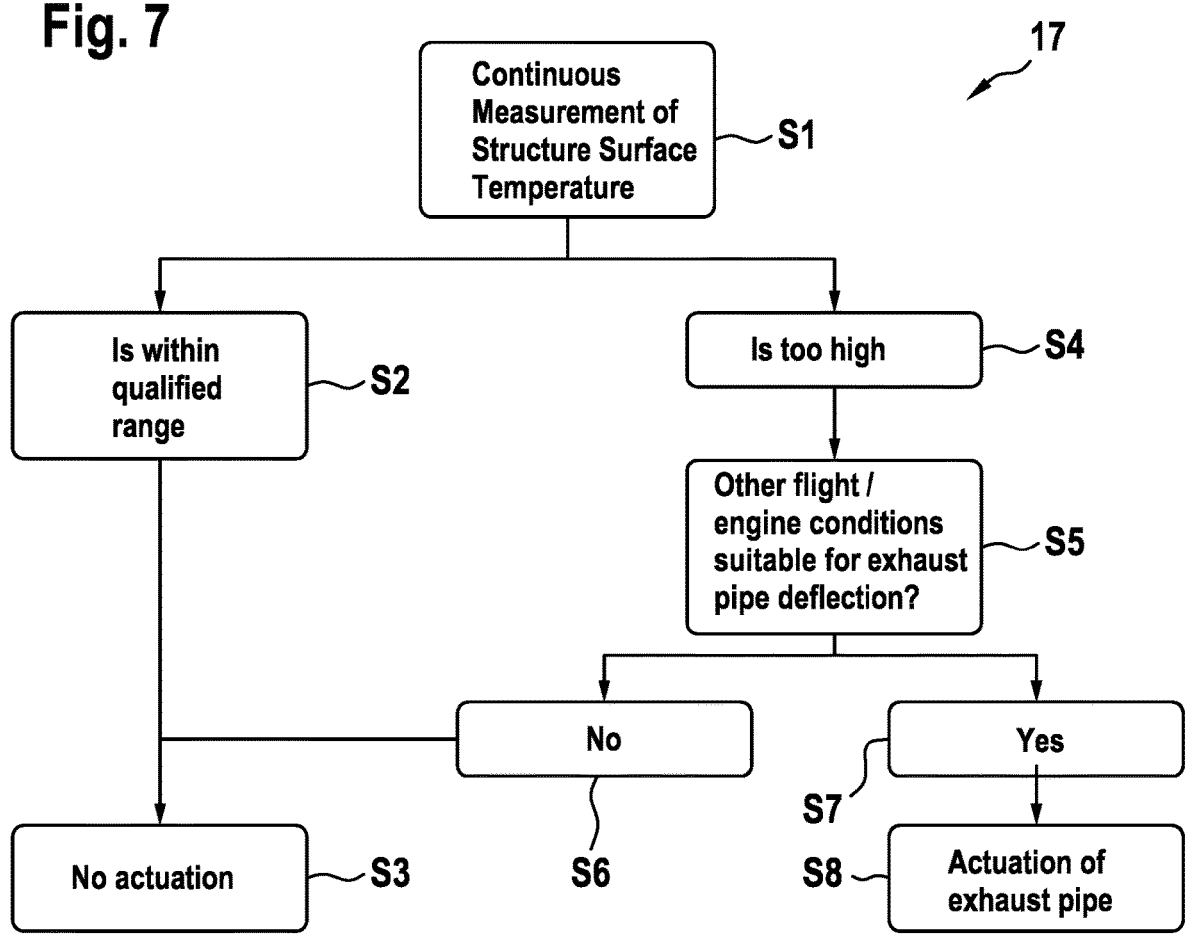
FIG. 7 shows a method of operating a hot air exhaust of an aircraft according to a first embodiment.

FIG. 7 shows an exemplary method 17 of operating the hot air exhaust 6 of FIG. 2 to FIG. 5 of the helicopter 1 of FIG. 1 in operation according to a first aspect of the present invention. The method 17 starts at step S1 with a determination of a current temperature at least in a region of the fuselage 2 of FIG. 1 of the helicopter 1 to which the generated hot air flow 7 of FIG. 1 is exhausted via the hot air exhaust 6 of FIG. 2 to FIG. 5. The current temperature is preferably continuously measured.

If it is determined at step S2 that the current temperature is within a qualified range, i.e. below a predetermined threshold value as described above, the method 17 continues at step S3, where the hot air exhaust 6 is further operated in normal operation mode according to FIG. 2 and FIG. 4. If, however, it is determined at step S4 that the current temperature is too high, i.e. above the predetermined threshold value, the method 17 continues at step S5. At step S5, current aviation parameters are determined, such as e.g. flight and/or engine conditions comprising exemplarily a current engine power output, airspeed and tail rotor pitch, and/or an engine/flight condition "history", e.g. monitoring of the last 10 min of flight, which are suitable for determining whether the hot air exhaust 6 should be switched from normal operation mode to heat-protection mode.

If it is determined at step S6 that the current aviation parameters do not require switching from normal operation mode to heat-protection mode, the method 17 continues at step S3. If, however, it is determined at step S7 that switching from normal operation mode to heat-protection mode is required, the hot air exhaust 6 is actuated at step S8 and a turning moment is applied via the actuating member 11 of FIG. 2 to FIG. 5, or the actuating member 14 of FIG. 6, to the rear exhaust section 6b of FIG. 2 to FIG. 5 of the hot air exhaust 6 as described above with reference to FIG. 3, for switching the hot air exhaust 6 from normal operation mode to heat-protection mode.

However, it should be noted that step S5 is preferably optional and must not necessarily be performed within method 17. In this case, steps S5, S6 and S7 can be omitted and the method 17 directly proceeds from step S4 to step S8.

Figure 8:
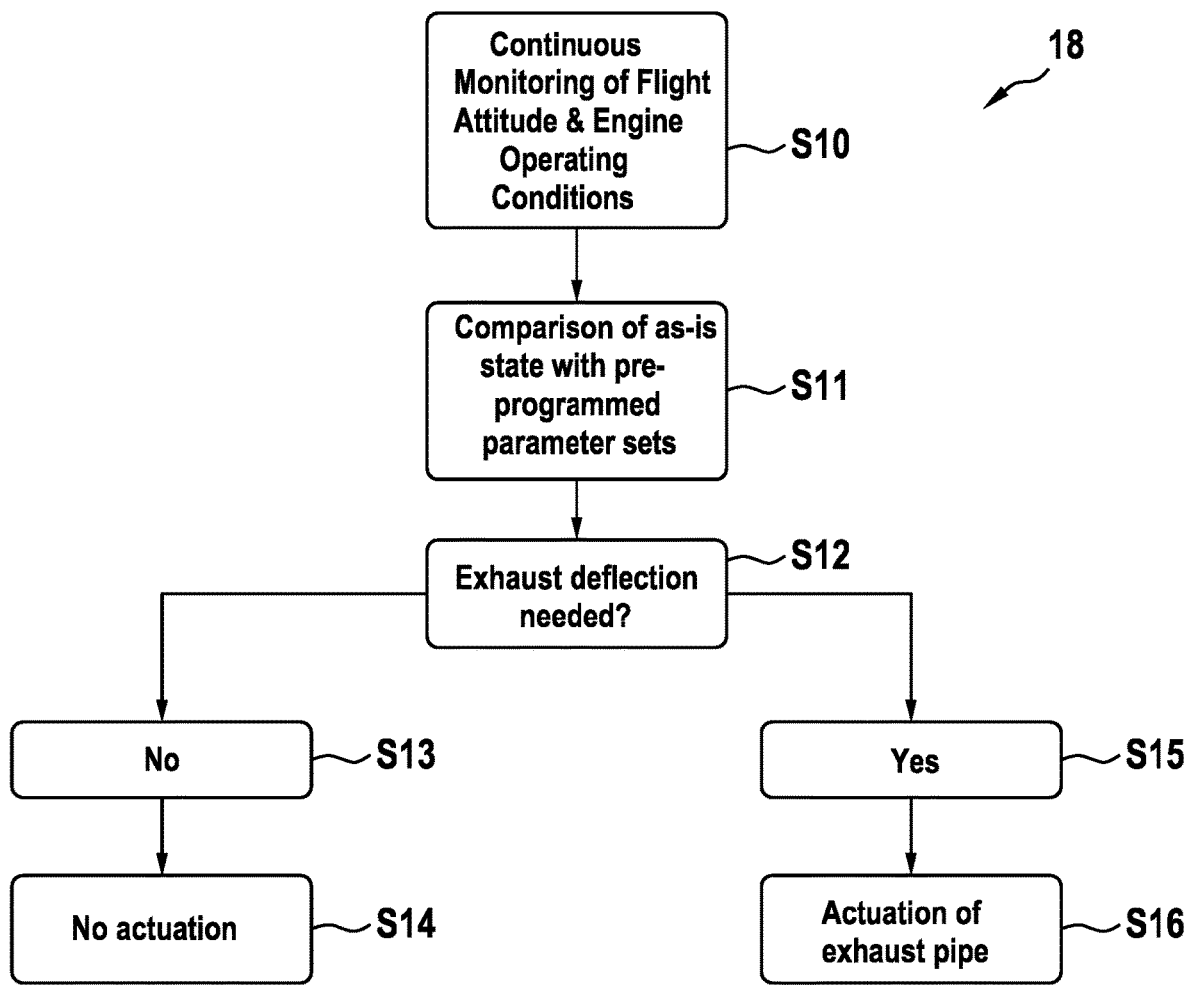
FIG. 8 shows a method of operating a hot air exhaust of an aircraft according to a second embodiment.

FIG. 8 shows an exemplary method 18 of operating the hot air exhaust 6 of FIG. 2 to FIG. 5 of the helicopter 1 of FIG. 1 in operation according to a second aspect of the present invention. The method 18 starts at step S10 with a determination of current aviation parameters, such as e.g. flight and/or engine conditions and, more specifically, flight attitude and/or engine operating conditions, comprising exemplarily a current engine power output, airspeed and tail rotor pitch, and/or an engine/flight condition "history", e.g. monitoring of the last 10 min of flight. The current aviation parameters are preferably continuously monitored.

At step S11, the determined current aviation parameters are compared to corresponding pre-programmed parameters sets. The pre-programmed parameter sets are preferably stored in the form of suitable look-up tables in an associated storage medium.

At step S12 it is determined whether the hot air exhaust 6 should be switched from normal operation mode to heat-protection mode. If it is determined at step S13 that switching is not required, the method 18 continues at step S14, where the hot air exhaust 6 is further operated in normal operation mode according to FIG. 2 and FIG. 4. If, however, it is determined at step S15 that switching is required, the method 18 continues at step S16, where the hot air exhaust 6 is actuated and a turning moment is applied via the actuating member 11 of FIG. 2 to FIG. 5, or the actuating member 14 of FIG. 6, to the rear exhaust section 6b of FIG. 2 to FIG. 5 of the hot air exhaust 6 as described above with reference to FIG. 3, for switching the hot air exhaust 6 from normal operation mode to heat-protection mode.

Figure 9:
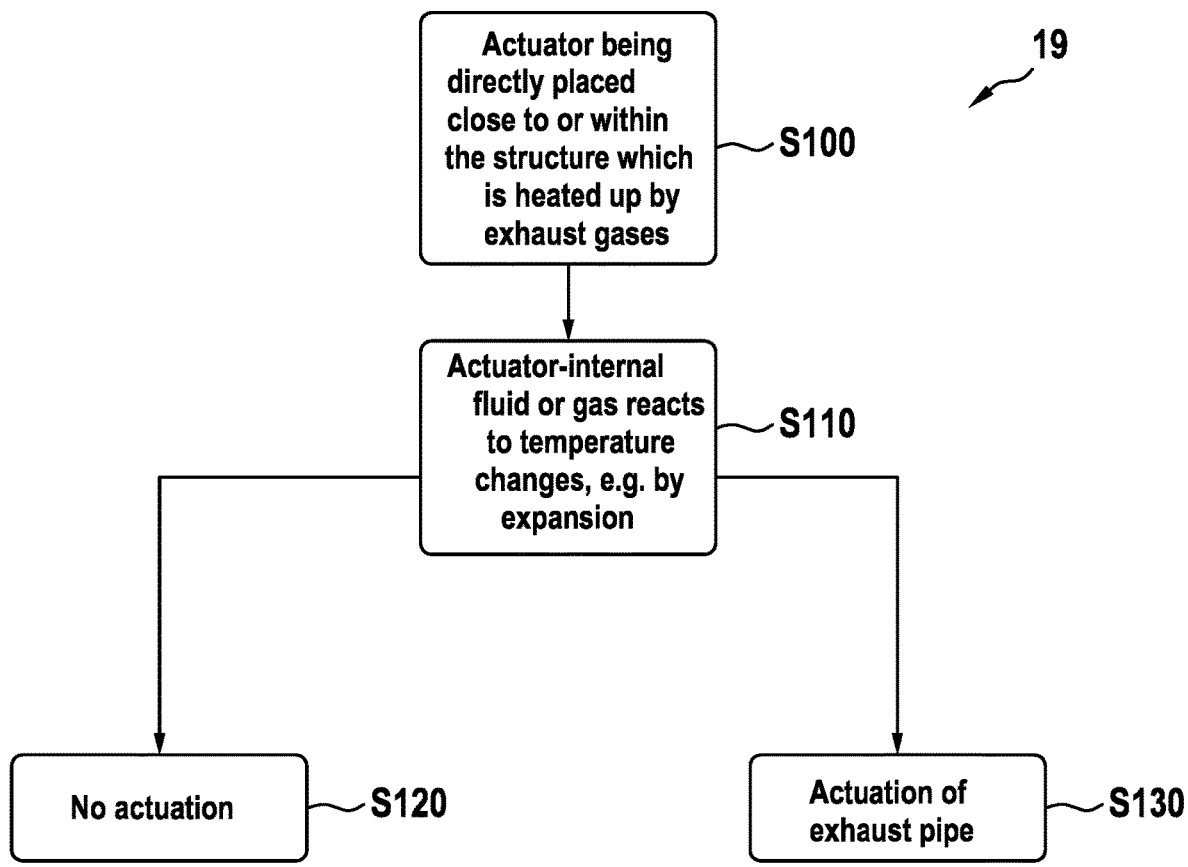
FIG. 9 shows a method of operating a hot air exhaust of an aircraft according to a third embodiment.

FIG. 9 shows an exemplary method 19 of operating the hot air exhaust 6 of FIG. 2 to FIG. 5 of the helicopter 1 of FIG. 1 in operation according to a third aspect of the present invention. The method 19 starts at step S100 with a determination of a current operation temperature of the actuating member 11 of FIG. 2 to FIG. 5. The current operation temperature is preferably continuously determined, preferentially indirectly by respective temperature-induced changes to the actuating member 11.

More specifically, at step S110, the activatable medium 11d of the temperature-sensitive actuator 11e of the actuating element 11 of FIG. 2 to FIG. 5 reacts, if changes of the current operation temperature occur. As described above, the activatable medium 11d preferably expands if the current operation temperature increases.

If no changes of the current operation temperature occur, the method 19 continues at step S120, where the hot air exhaust 6 of the helicopter 1 of FIG. 1 is further operated in normal operation mode according to FIG. 2 and FIG. 4. If, however, changes of the current operation temperature occur and the activatable medium 11d expands, the method 19 continues at step S130, where the hot air exhaust 6 is actuated and a turning moment is applied via the actuating member 11 of FIG. 2 to FIG. 5 to the rear exhaust section 6b of FIG. 2 to FIG. 5 of the hot air exhaust 6 as described above with reference to FIG. 3, for switching the hot air exhaust 6 from normal operation mode to heat-protection mode.

It should be noted that the above embodiments are merely described by way of example and not for limiting the present invention thereto. Instead, various modifications thereof are within the common knowledge of the person skilled in the art and should, therefore, also be construed as being part of the present invention. For instance, the methods 17, 18 and 19 of FIG. 7 to FIG. 9 can be combined to a single method. Furthermore, a degree of deflection of the generated hot air flow 7 of FIG. 2 to FIG. 5 can be individually adjusted dependent on current temperature values, and so on.

REFERENCE LIST 1 aircraft
1a main rotor
1b, 1c rotor blades
1d rotor head
1e rotor shaft
1f drive system accommodating region
1g aircraft outer surface 2 fuselage
2a fuselage interior region
2b tail boom
2c fin
2d upper fuselage side
3 counter-torque device
3a tail rotor
4 main gearbox
5 main engines
6 main engine hot air exhaust
6a front exhaust
6b rear exhaust
6c front exhaust diameter
6d rear exhaust diameter
6e front exhaust longitudinal axis
6f front exhaust transversal direction
6g rear exhaust longitudinal axis
6h hot air exhaust outlet
7 main engine exhaust air flow
8 firewall arrangement
8a front fire protection wall
8b rear fire protection wall
8c lower fire protection wall
8d middle fire protection wall
9 fire protection zones
10 off-axis swivel joint
11 actuating member
11a exhaust actuating member bearing
11b fuselage actuating member bearing
11c actuator actuation movement direction
11d activatable medium
11e actuator
11f sensor
12a normal mode swivel angle
12b deflected mode horizontal displacement angle
12c deflected mode vertical inclination angle
13 rear exhaust rotation direction
14 double-sided actuating member
14a double-sided actuator
14b expandable medium
15a, 15b control rods
16a, 16b control movement directions
17 First operating method
S1-S8 Method steps of first operating method
18 Second operating method
S10-S16 Method steps of second operating method
19 Third operating method
S100-S130 Method steps of third operating method

What is claimed is:

1. An aircraft with a fuselage that defines at least one drive system accommodating region, the drive system accommodating region accommodating at least one engine that generates a hot air flow in operation of the aircraft, wherein at least one hot air exhaust is provided for exhausting the hot air flow, the at least one hot air exhaust comprising at least one first exhaust section and at least one second exhaust section, the at least one second exhaust section mounted in a rotatable manner to the at least one first exhaust section via an associated off-axis swivel joint, wherein an actuating member is provided, the actuating member adapted for applying a turning moment to the at least one second exhaust section in operation of the aircraft in order to displace a longitudinal axis of the at least one second exhaust section with respect to a longitudinal axis of the at least one first exhaust section by a predetermined displacement angle;
wherein the actuating member is adapted for applying a turning moment on the basis of a current operation temperature of the actuating member, wherein the actuating member comprises a temperature-sensitive actuator equipped with an expandable fluid, gas or rigid material adapted for expanding if the current operation temperature of the actuating member increases.

2. The aircraft according to claim 1, wherein the temperature-sensitive actuator is at least mounted adjacent to a temperature-critical area of the fuselage.

3. The aircraft according to claim 1, wherein the actuating member is mounted to the at least one second exhaust section by means of a first bearing and to the fuselage by means of a second bearing.

4. The aircraft according to claim 1, wherein the temperature-sensitive actuator is equipped with the expandable rigid material.

5. The aircraft according to claim 4, wherein the temperature-sensitive actuator is at least mounted adjacent to a temperature-critical area of the fuselage.

6. The aircraft according to claim 1, wherein the actuating member and/or sensors that are provided for controlling actuation of the actuating member are adapted for operation at temperatures between 100° C. and 250° C.

7. The aircraft according to claim 6, wherein the sensors comprise at least one temperature sensor.

8. The aircraft according to claim 1, wherein the associated off-axis swivel joint defines a swivel angle to a transversal direction of the at least one first exhaust section comprised in a range between 5° and 30°.

9. The aircraft according to claim 1, wherein the predetermined displacement angle is comprised in a range between 10° and 30°.

10. The aircraft according to claim 1, wherein the at least one second exhaust section comprises an exhaust diameter greater than an exhaust diameter of the at least one first exhaust section.

11. The aircraft according to claim 1, wherein the predetermined displacement angle is based on at least one of: current aviation parameters of the aircraft in operation, a current temperature in a region of the fuselage to which the generated hot air flow is exhausted via the at least one hot air exhaust and/or a current operation temperature of the actuating member.

12. A method of operating a hot air exhaust of an aircraft with a fuselage, the hot air exhaust adapted for exhausting a hot air flow generated by at least one engine of the aircraft in operation and comprising at least one first exhaust section and at least one second exhaust section, the at least one second exhaust section mounted in a rotatable manner to the at least one first exhaust section via an associated off-axis swivel joint and rotatable by means of an actuating member, the method comprising at least the steps of:
determining current aviation parameters of the aircraft in operation, a current temperature in a region of the fuselage to which the hot air flow is exhausted via the hot air exhaust and/or a current operation temperature of the actuating member, and
applying a turning moment to the at least one second exhaust section by means of the actuating member on the basis of the current aviation parameters of the aircraft in operation, the current temperature in a region of the fuselage to which the hot air flow is exhausted via the hot air exhaust and/or the current operation temperature of the actuating member in order to displace a longitudinal axis of the at least one second exhaust section with respect to a longitudinal axis of the at least one first exhaust section by a predetermined displacement angle, wherein the actuating member comprises a temperature-sensitive actuator equipped with an expandable rigid material adapted for expanding if the current operation temperature of the actuating member increases, wherein the predetermined threshold value defines a temperature at which the expandable rigid material starts to expand in operation.

13. The method according to claim 12, wherein the step of applying the turning moment to the at least one second exhaust section comprises applying the turning moment to the at least one second exhaust section if the current operation temperature of the actuating member exceeds a predetermined threshold value.

14. The method according to claim 12, wherein the temperature sensitive actuator further comprises an expandable fluid or gas.

15. An aircraft with a fuselage that defines at least one drive system accommodating region, the drive system accommodating region accommodating at least one engine that generates a hot air flow in operation of the aircraft, wherein at least one hot air exhaust is provided for exhausting the hot air flow, the at least one hot air exhaust comprising at least one first exhaust section and at least one second exhaust section, the at least one second exhaust section mounted in a rotatable manner to the at least one first exhaust section via an associated off-axis swivel joint, wherein an actuating member is provided, the actuating member adapted for applying a turning moment to the at least one second exhaust section in operation of the aircraft in order to displace a longitudinal axis of the at least one second exhaust section with respect to a longitudinal axis of the at least one first exhaust section by a predetermined displacement angle on the basis of at least one of: current aviation parameters of the aircraft in operation, a current temperature in a region of the fuselage to which the hot air flow is exhausted via the at least one hot air exhaust and/or a current operation temperature of the actuating member, wherein the actuating member is mounted to the at least one second exhaust section by means of a first bearing and to the fuselage by means of a second bearing.

16. The aircraft according to claim 15, wherein the actuating member is at least mounted adjacent to a temperature-critical area of the fuselage.

17. The aircraft according to claim 15, wherein the actuating member comprises a temperature-sensitive actuator, the temperature-sensitive actuator equipped with an expandable rigid material adapted for expanding if the current operation temperature of the actuating member increases.

18. The aircraft according to claim 17, wherein the temperature-sensitive actuator is at least mounted adjacent to a temperature-critical area of the fuselage.

19. The aircraft according to claim 15, wherein the actuating member and/or sensors that are provided for controlling actuation of the actuating member are adapted for operation at temperatures between 100° C. and 250° C.

* * * * *